Figure 1:
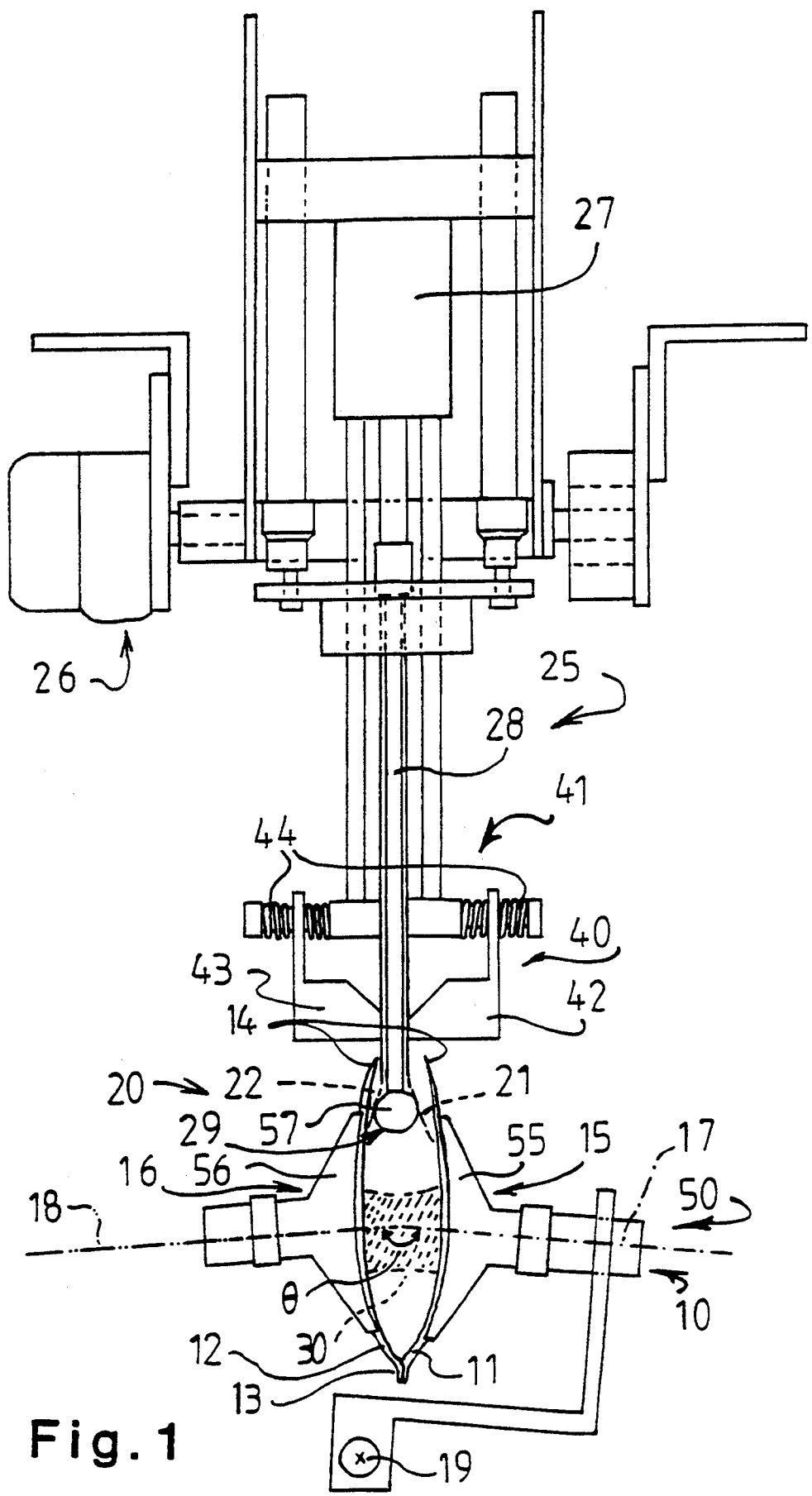

United States Patent [19]
Adcock

[11] Patent Number: 5,427,567
[45] Date of Patent: Jun. 27, 1995

[54] SHELLFISH PROCESSING

[75] Inventor: John T. Adcock, Keysborough, Australia

[73] Assignee: Sasakat Pty Ltd, Keysborough, Australia

[21] Appl. No.: 162,157
[22] PCT Filed: Jun. 12, 1992
[86] PCT No.: PCT/AU92/00285
 § 371 Date: Dec. 13, 1993
 § 102(e) Date: Dec. 13, 1993
[87] PCT Pub. No.: WO92/22212
 PCT Pub. Date: Dec. 23, 1992

[30] Foreign Application Priority Data

Jun. 12, 1991 [AU] Australia .................. PK6647

[51] Int. Cl.⁶ .......................................... A22C 29/04
[52] U.S. Cl. ................................. 452/13; 452/118
[58] Field of Search .................. 452/13, 8, 9, 10, 15, 452/16, 18, 20, 118

[56] References Cited

U.S. PATENT DOCUMENTS 2,391,739 12/1945 Ragupos .................. 452/13
3,128,496 4/1964 Bertrand .................. 17/9
5,145,448 9/1992 Ebisuzaki .................. 452/13

FOREIGN PATENT DOCUMENTS 1464856 1/1967 France .................. 452/13
49-7919 9/1969 Japan .
3-201935 9/1991 Japan .
4-11834 1/1992 Japan .
4-16144 1/1992 Japan .

Primary Examiner—Willis Little
Attorney, Agent, or Firm—John R. Flanagan

[57] ABSTRACT

Apparatus for mechanically and automatically processing a bivalve shellfish having a first shell (11) an second shell (12) so as to recover an edible portion (30) of the shellfish. The apparatus includes suction cups (55, 56) to part the two shells (11, 12) without completely separating the two shells. Flexible detaching blades (21, 22) enter the space between the two shells and diverge to contact and to follow the inner surfaces (11a, 12a) of the shells to cut the edible portion (30) of the shellfish from both the first shell (11) and the second shell (12) simultaneously. The blades (21, 22) then grip the edible portion to enable recovery thereof and the shells are discarded.

18 Claims, 2 Drawing Sheets

SHELLFISH PROCESSING

This invention relates to the processing of bivalve shellfish for recovering the edible portions. The invention has been particularly developed for processing of scallops but the invention is also applicable to other shellfish where similar problems in recovering the edible portions of the shellfish are encountered.

It is known to manually process a scallop by inserting a knife between the two shells so as to partially part the shells, after which the knife is twisted to cut the edible portion (consisting of the adductor muscle) from one of the shells. The labour costs associated with manual processing of scallops to recover the edible portions are relatively high.

In Australian Patent Specification No. 25,507/84 there is disclosed a machine for processing a scallop in which the scallop shells are firstly slightly parted by a wedge or by suction applied to the outsides of the shells, after which an oscillating blade is inserted between the shells and is directed to pass along the inside surface of a first one of the two shells so as to separate the adductor muscle from that first shell. The first shell is then discarded and the second shell with the adductor muscle remaining attached undergoes a further processing to firstly separate the offal and then to separate the adductor muscle from the second shell.

It is an object of the present invention to provide an alternative apparatus for use in recovering the edible portions of shellfish.

It is a preferred objection to provide an apparatus for processing shellfish in which the edible portion can be separated from the two shells for further processing.

According to the present invention there is provided an apparatus for mechanically and automatically processing a bivalve shellfish having a first shell and second shell so as to recover an edible portion of the shellfish, the apparatus including access forming means for enabling access to the space between the two shells without completely separating the two shells, the apparatus further including detaching means for entry into the space between the two shells, the apparatus being characterised in that the detaching means is operable to mechanically detach the edible portion of the shellfish from both the first shell and the second shell to thereby enable recovery of the edible portion.

With this arrangement of apparatus it is possible to recover the fleshy portion which includes the edible portion of a shellfish, possibly together with other inedible or undesired portions of the shellfish, e.g. the mantle in the case of a scallop, so that the shells can be discarded and the fleshy portion recovered can be processed further. In the case of a scallop, the fleshy portion comprises the adductor muscle, possibly with roe attached in some species, together with the mantle. This fleshy portion can be separated from the shells in one operation so that the shells can be discarded and the recovered edible and other portions can be further processed to separate and clean the edible portion or portions.

The access forming means preferably comprises parting means for mechanically parting the two shells by applying relatively oppositely directed forces to the two shells.

The parting means in one possible embodiment may comprise a parting tool operable to be inserted between the two shells at a region other than the region where the two shells are hinged together. The parting tool may be constructed and arranged to operate generally as described and illustrated in Australian Patent Specification 25,507/84.

The parting means in the more preferable embodiment comprises means for drawing the two shells apart, the means for drawing the two shells apart comprising two suction means arranged to be applied to respective outer surfaces of the two shells the suction means being initially movable relatively towards each other so to engage with and grip by suction the outer surfaces of the two shells and subsequently being selectively movable relatively away from each other to draw the two shells apart. The shells may be moved apart only by a relatively limited extent, e.g. about 8 mm to enable the detaching means to be inserted into the space between the parted shells.

The suction means may comprise respective suction cups which are selectively advanced and retracted on respective movement lines which are not collinear and which intersect at the edible portion at an obtuse angle, the two shells being connected together at a hinge region and being movable apart by hinging movement about the hinge region, the movement lines defining a plane which is at right angles to the hinge axis about which the shells move and the obtuse angle defined between the movement lines facing the hinge region, whereby when the suction cups are being relatively moved apart, the shells open at their edges remote from the hinge region. The obtuse angle may be about 170°. With this arrangement when the suction cups are being moved apart, the shells move about the region where they are hinged together more naturally than if the suction cups were moved collinearly and directly apart from each other.

One of the suction cups may be mounted for advancing and retracting movement about a pivot axis located in the general vicinity of the hinge region of the two shells.

The detaching means is preferably operable to detach the edible portion of the shellfish from both the shells while the parting means is holding the two shells in a parted condition, the holding of the two shells in a parted condition applying tension to the edible portion (particularly to the adductor muscle in the case of a scallop) so as to assist in separation of the edible portion from shells.

The detaching means is preferably operative to detach the edible portion simultaneously from both the first shell and the second shell. The detaching means may comprise cutting means arranged to be inserted between the two shells when the access forming means is providing access to the space between the two shells. The cutting means during its cutting operation being located closely adjacent to the respective inner surfaces of the two shells so as to sever the edible portion close to the inside surfaces of the shells and maximise the recovery of the edible matter. The cutting means preferably comprises two cutting blades which are flexible so as to follow the inner surfaces of the respective shells as they are advanced and thereby cut the edible portion from the inner surfaces of the respective shells. The cutting blades may be oscillated in their respective planes as they are advanced to create a sawing action.

The cutting means may include a cutting head which is arranged to be located in the vicinity of the parted shells, the cutting head mounting both the cutting blades and the detaching means. The detaching means may include means for advancing the cutting blades, the blades being advanced on diverging paths so as to contact the respective inner surfaces of the two shells before reaching the edible portion so that, upon continued advance of the cutting blades, each blade follows the inner surface of a respective one of the two shells and cuts the edible portion from the respective shell closely adjacent to the inner surface thereof. In the case of scallops, this edible portion comprises the adductor muscle and, in some species, the roe which is attached to the adductor muscle.

The apparatus may include diverging means for causing a diverging movement of the cutting blades as they are advanced, the diverging means comprising a deflector member located in the path of advance of the cutting blades whereby as the cutting blades are advanced, they encounter the deflector member and are deflected thereby outwardly and into engagement with the inner respective surfaces of the shells. The deflector member may comprise for example a rod extending generally transverse to the line of advance of the cutting blades and generally parallel to the planes of the two blades so that as the blade tips encounter the rod, they are urged apart thereby.

The apparatus preferably further includes means for grasping the edible portion after the cutting means has cut the edible portion from the two shells. Preferably the grasping means comprises the two cutting blades and means for causing the cutting blades to grasp the edible portion after cutting by the blades along the inner surfaces of the two shells. The grasping means may include urging means urging the cutting blades towards each other so as to grasp the edible portion of the shellfish between the two cutting blades, the urging means being operative to act on the outside faces of the blades after they have cut the edible portion from the shells. The urging means may comprise jaw members which resiliently urge the cutting blades towards each other. The jaw members are arranged to urge the cutting blades towards each other about a fulcrum, the fulcrum being comprised by the deflector member which is retracted away from the shellfish after the blades have cut along the inside surfaces of the shells, the deflector member being retracted past the jaw members and remaining between the two cutting blades so as to thereby define the fulcrum.

The cutting blades in plan view need not be parallel but may define a shallow acute angle between the planes of the two cutting blades whereby when the edible portion is grasped by the cutting blades and moved away from the two shells, it can be discharged from the grasping means preferentially towards the direction in which the cutting blades diverge from each other.

The deflector member may be operative to be advanced after grasping of the edible portion by the grasping means whereby the deflector member ejects the edible portion from between the cutting blades.

After the operation of the grasping means to grasp the edible portion, the parting means is preferably operative to further separate the shells which by this stage will have the principal operative connection between the two shells severed by the cutting means. For example, the parting means which is comprised by suction means may be operative to continue to move the two shells relatively apart, preferably generally about the hinge connection although preferably also including some directly opposed parting movement so as to rupture or tear the connection at tile hinge and thereby completely separate the two shells. At this stage the two shells may be removed and discarded.

In an alternative embodiment, the grasping means may be operable after grasping the edible portion to move away from the two shells, e.g. by being moved laterally in a line parallel to the plane of symmetry of the two shells, so as to move the edible portion away from the space between the two shells, thereby enabling recovery of the edible portion and enabling discarding of the two shells which remain attached together at the hinge region.

After recovery of the fleshy portion of the shellfish, the fleshy portion which includes the edible portion and offal or other portions to be discarded can be further processed to recover the edible portion, e.g. by a washing and/or brushing process of the general kind known in the past to be used for separating the edible and offal portions of scallops which have been removed from their shells by a steaming operation.

Figure 3:
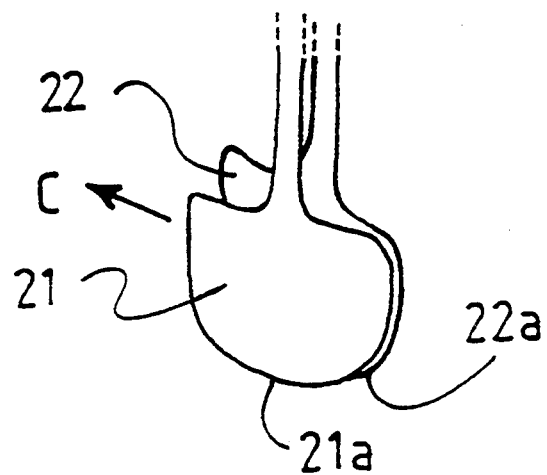
Figure 2:
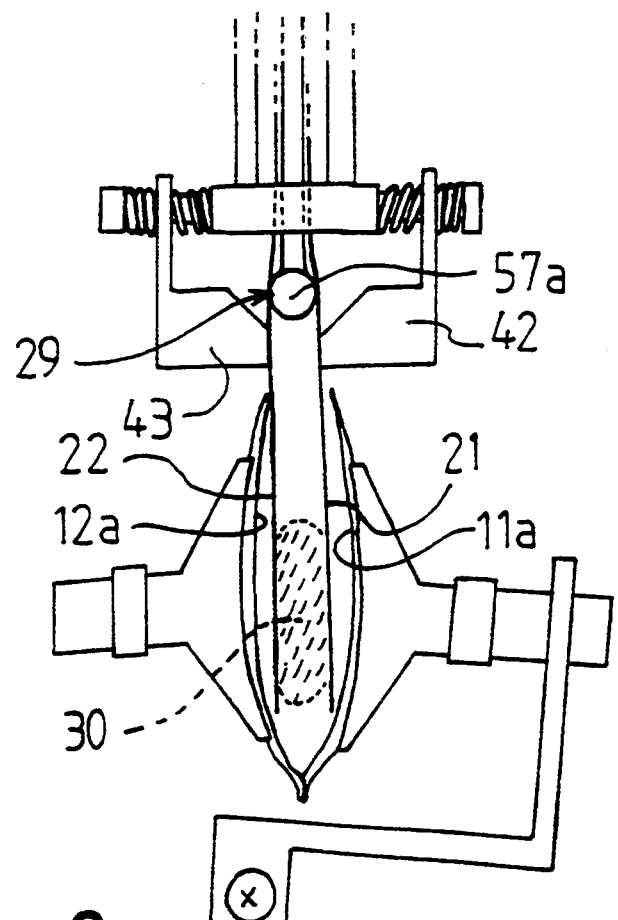

Possible and preferred features of the present invention will now be described with particular reference to the accompanying drawings. However it is to be understood that the features illustrated in and described with reference to the drawings are not to be construed as limiting on the scope of the invention. In the drawings:

FIG. 1 is a schematic side view of an apparatus embodying the present invention, FIG. 2 is a view similar to FIG. 1 showing the apparatus in a later stage of the sequence of operations, and FIG. 3 is a detailed perspective view of the cutting blades.

The apparatus in FIG. 1 includes access forming means 10 comprising parting means 50 for mechanically parting the two shells 11, 12 of a shellfish (shown as a scallop). The shells 11, 12 are connected at the hinge region 13. The parting means includes two opposed suction means 15, 16 defined by suction cups 55, 56 which have soft peripheries which are arranged to engage the outside surfaces of the shells 11, 12 and so that by means of an applied vacuum, the cups conform to the shape of the shells 11, 12 and enable the application of a parting force.

The general axes 17, 18 of the suction cups 55, 56 are arranged at an angle 0° of about 170° to each other so that by relative movement of the suction cups 55, 56 apart along their respective axes 17, 18, the shells 11, 12 will be drawn apart at their top edges 14 while the hinge region 13 remains connected. The suction cup 55 is shown mounted for pivotal movement about axis 19 which extends generally parallel to the general plane of symmetry of the shellfish and is relatively close to the hinge region 13.

The detaching means 20 comprises two flexible cutting blades 21, 22 shown in FIG. 3 as being spade shaped with curved cutting edges 21a, 22a. The blades are mounted by a cutting head 25. The cutting head is movable by means of drive 26 so as to move the cutting blades 21, 22 into the space between the parted shells 11, 12 from a lateral position e.g. with a swinging movement like a pendulum. The cutting head 25 also includes advancing means 27 for simultaneously advancing the two cutting blades 21, 22 towards the general centre of the region between the two shells 11, 12. The detaching means 20 includes diverging means 29 shown as a deflector member 57 in the form of a generally circular cross section rod mounted by a support 28 extending up between the blades 21, 22, the rod extending transverse to the line of advance of the blades 21, 22 and in the general plane of symmetry of the shellfish. As the blades 21, 22 are advanced, they encounter the deflector member 57 so as to be advanced on diverging paths as shown in dotted line in FIG. 1 to contact respective inner surfaces 11a, 12a of the shells 11, 12. The blades 21, 22 are flexible so that as they continue to be advanced, and are held apart by the deflector member 57, they will advance along the inside surfaces 11a, 12a and cut the connection of the adductor muscle 30 at the inside surfaces of the shells. In the case of scallops, the adductor muscle 30 applies a strong force holding the two shells 11, 12 together so that the drawing of the two shells apart by the suction means 15, 16 applies tension to the adductor muscle 30 which, in turn, promotes cutting thereof from the inside surfaces 11a, 12a as the blades 21, 22 advance.

When the blades 21, 22 have advanced and cut the adductor muscle 30 from the inside surfaces 11a, 12a, the grasping means 40 comes into operation. The grasping means 40 comprises the two cutting blades 21, 22 and urging means 41 for urging the cutting blades 21, 22 towards each other so as to grasp the adductor muscle 30 and other fleshy parts of the shellfish located between the two blades. The urging means 41 is shown as comprising two jaws 42, 43 which are shown as bearing against the outer surfaces of the cutting blades 21, 22 by means of springs 44. The application of the grasping force to the adductor muscle 30 by the jaws 42, 43 is achieved by retracting the deflector member 57 beyond the location of the jaws 42, 43, as shown in FIG. 2. In this position, the force applied to the outside faces of the cutting blades 21, 22 by the jaws 42, 43 causes the blades 21, 22 to grasp the adductor muscle 30 between the blades since the deflector member 57 in the position shown in FIG. 2 will be acting as a fulcrum 57a.

After this position shown in FIG. 2 is reached, the cutting head 25 can be retracted either laterally in the general plane of the shellfish or directly upwardly and away from the shellfish so as to thereby remove the fleshy portion of the shellfish, including the edible adductor muscle 30, from between the two shells 11, 12. The two shells can then be discarded while remaining connected together. Alternatively, the suction means 15, 16 can be moved further apart so as to rupture the connection at the hinge region 13 enabling the two shells 11, 12 to be separately discarded.

When the grasping means 40 has been retracted and the edible portion 30 is held between the blades 21, 22, the deflector member 57 can be advanced again so as to eject the edible portion 30 from between the two blades. As shown in FIG. 3, the blades 21, 22 are not parallel but define a shallow acute angle between their respective planes. This does not interfere with the cutting of the edible portion from the inside surfaces 11a, 12a of the two shells because of the flexibility of the blades. However when the edible portion 30 is being ejected, the provision of a shallow acute angle between the blades 21, 22 will cause the edible portion 30 to be ejected preferentially towards the direction C which the blades diverge so that the edible portion 30 can be directed into a collection chute (not shown) located in that general direction C.

The fleshy portion of the shellfish recovered from inside the shells can be further processed, e.g. by washing and/or brushing processes to separate the edible portion to be ultimately recovered from other portions to be discarded such as offal portions (which in the case of scallops comprises the mantle).

It will be seen that the apparatus described and illustrated enables a bivalve shellfish, particularly a scallop, to be located and held, after which the shells are parted to a limited degree enabling the insertion of detaching means operative to preferably simultaneously detach the fleshy portion from the inside surfaces of the two shells, at least to a sufficient extent to enable the fleshy portion to be withdrawn or to enable the shells to be further separated. In the preferred embodiment, the fleshy portion of the shellfish is separated from the inner surfaces of the two opposed shells and the fleshy portion, including the edible portion to be ultimately recovered, is grasped so as to enable withdrawal of that portion from the shells, tile withdrawn matter being then further processed.

The detaching of the edible portion from both the shells enables the shells to be discarded at an early stage of the processing operation and the recovered fleshy portion to be further processed without the need for handling of the shells during further operations to recover the desired edible portions.

It is to be understood that various alterations, modifications and/or additions may be made to the features of the possible and preferred embodiment(s) of the invention as herein described without departing from the scope of the invention as defined in the claims.

I claim:

1. Apparatus for mechanically and automatically processing a scallop being a bivalve shellfish having a first shell (11) and second shell (12) joined together at a hinge region (13) so as to recover an edible portion (30) of the shellfish, said apparatus comprising:

access forming means (10) for enabling access to the space between the first and second shells (11, 12) without completely separating the first and second shells at the hinge region, said access forming means (10) comprising parting means (50) for mechanically parting the first and second shells (11, 12) by applying relatively oppositely directed forces to the first and second shells (11, 12), said parting means (50) comprising drawing means for drawing the first and second shells (11, 12) apart, said drawing means comprising two suction means (15, 16) arranged to be applied to respective outer surfaces of the first and second shells (11, 12), said suction means (15, 16) being initially movable relatively towards each other so as to engage with and grip by suction the outer surfaces of the first and second shells (11, 12) and subsequently being selectively movable relatively away from each other to draw the first and second shells (11, 12) apart, said suction means (15, 16) comprises respective suction cups (55, 56) which are selectively advanced and retracted on respective movement lines (17, 18) which are not collinear and which intersect at the edible portion (30) at an obtuse angle (0), one of said suction cups (55) being mounted for advancing and retracting movement about a pivot axis (19) located in the general vicinity of said hinge region (13) of the first and second shells (11, 12), the first and second shells (11, 12) being joined together at the hinge region (13) and being movable apart by hinging movement about a hinge axis passing through the hinge region (13), said movement lines (17, 18) defining a plane which is at right angles to the hinge axis about which the first and second shells (11, 12) move, said obtuse angle (0) defined between said movement lines (17, 18) facing the hinge region (13), whereby when said suction cups (55, 56) are being relatively moved apart, the first and second shells (11, 12) open at edges (14) thereof being remote from the hinge region (13) to create an access to the space between the first and second shells (11, 12); and detaching means (20) for entry through said access made by the parting of the first and second shells (11, 12) and into the space between the first and second shells (11, 12), said detaching means (20) being operable to mechanically detach the edible portion (30) of the shellfish from both the first shell (11) and the second shell (12) to thereby enable recover of the edible portion (30).

2. Apparatus as claimed in claim 1 wherein said detaching means (20) is operable to detach the edible portion (30) of the shellfish from both the first and second shells (11, 12) while said parting means (50) is holding the first and second shells in a parted condition, the holding of the first and second shells in the parted condition applying tension to the edible portion (30) so as to assist in separation of the edible portion (30) from the first and second shells (11, 12).

3. Apparatus for mechanically and automatically processing a scallop being a bivalve shellfish having a first shell (11) and second shell (12) connected together at a hinge region (13) so as to recover an edible portion (30) of the shellfish, said apparatus comprising:

access forming means (10) for enabling access to the space between the first and second shells (11, 12) without completely separating the first and second shells (11, 12) at the hinge region, the first and second shells (11, 12) being connected together at the hinge region (13) and being movable apart by hinging movement about the hinge region (13), said access forming means (10) comprising parting means (50) for mechanically parting the first and second shells (11, 12) so that the first and second shells (11, 12) part at edges (14) thereof being remote from the hinge region (13) to create an access to the space between the first and second shells (11, 12); and detaching means (20) for entry through the access made by the parting of the first and second shells (11, 12) and into the space between the first and second shells (11, 12), said detaching means (20) being operable to mechanically detach the edible portion (30) of the shellfish simultaneously from both the first shell (11) and the second shell (12) while remaining connected together at the hinge region (13) to thereby enable recovery of the edible portion (30).

4. Apparatus as claimed in claim 3 wherein said detaching means (20) comprises cutting means (21, 22) arranged to be inserted between the first and second shells when said access forming means (10) is providing access to the space between the first and second shells (11, 12), said cutting means (21, 22) for performing a cutting operation and during said cutting operation being located closely adjacent to the respective inner surfaces of the first and second shells (11, 12) so as to sever the edible portion (30) close to the inside surfaces of the first and second shells (11, 12) and maximise the recovery of the edible portion.

5. Apparatus as claimed in claim 4 wherein said cutting means (21, 22) comprises two cutting blades which are flexible so as to follow the inner surfaces of the respective first and second shells (11, 12) as they are advanced and thereby cut the edible portion (30) from the inner surfaces of the respective first and second shells (11, 12) .

6. Apparatus as claimed in claim 5 wherein said detaching means (20) includes means (27) for advancing said cutting blades (21, 22), said blades (21, 22) being advanced on diverging paths so as to contact the respective inner surfaces of the first and second shells (11, 212) before reaching the edible portion (30) so that, upon continued advance of said cutting blades (21, 22), each said blade follows the inner surface of a respective one of the first and second shells (11, 12) and cuts the edible portion (30) from the respective shell closely adjacent to the inner surface thereof.

7. Apparatus as claimed in claim 6 further comprising:

diverging means (29) for causing a diverging movement of said cutting blades (21, 22) as they are advanced, said diverging means (29) comprising a deflector member (57) located in the path of advance of said cutting blades (21, 22) whereby as said cutting blades (21, 22) are advanced, said cutting blades encounter said deflector member (57) and are deflected thereby outwardly and into engagement with the respective inner surfaces of the first and second shells (11, 12).

8. Apparatus for mechanically and automatically processing a scallop being a bivalve shellfish having a first shell (11) and a second shell (12) joined together at a hinge region (13) so as to recover an edible portion (30) of the shellfish, said appratus comprising:

access forming means (10) for forming an access to the space between the first and second shells (11, 12) without completely separating the first and second shells (11, 12);

detaching means (20) for entry through the access and into the space between the first and second shells (11, 12), said detaching means (20) being operable to mechanically detach the edible portion (30) of the shellfish from both the first shell (11) and the second shell (12) to thereby enable recovery of the edible portion (30); and grasping means (40) for entry into the space between the first and second shells (11, 12) and for grasping the edible portion (30) after said detaching means (20) has detached the edible portion (30) from the first and second shells (11, 12).

9. Apparatus as claimed in claim 8 wherein, after operation of said grasping means (40) to grasp the edible portion (30), said access forming means (10) is operative to further separate the first and second shells (11, 12), the further separating movement including at least some directly opposed parting movement so as to rupture the joining of the first and second shells 911, 12) at the hinge region (13) and thereby completely separating the first and second shells.

10. Apparatus as claimed in claim 8 wherein said grasping means (40) is operable after grasping the edible portion (30) to move away from the first and second shells (11, 12) so as to move the edible portion (30) away from the spaced between the first and second shells, thereby enabling recovery of the edible portion (30) and enabling discarding of the first and second shells (11, 12) which remain joined together at the hinge region (13).

11. Apparatus as claimed in claim 8 wherein said detaching means (20) is operative to detach the edible portion (30) simultaneously from both the first shell (11) and the second shell (12).

12. Apparatus as claimed in claim 11 wherein said detaching means comprises cutting means (21, 22) arranged to be inserted between the first and second shells (11, 12) when said access forming means (10) is providing access to the space between the first and second shells (11, 12), said cutting means (21, 22) during its cutting operation being located closely adjacent to the respective inner surfaces of the first and second shells (11, 12) so as to sever the edible portion (30) close to the inside surfaces of the first and second shells (11, 12) and maximise the recovery of the edible portion (30).

13. Apparatus as claimed in claim 12 wherein said grasping means (40) comprises said two cutting blades (21, 22) and means (41) for causing said cutting blades (21, 22) to grasp the edible portion (30) after said blades have cut along the inner surfaces of the first and second shells (11, 12).

14. Apparatus as claimed in claim 13 wherein said grasping means (40) includes urging means (41) for urging said cutting blades (21, 22) towards each other so as to grasp the edible portion (30) of the shellfish between said two cutting blades (21, 22), said urging means (41) being operative to act on outside faces of said cutting blades (21, 22) after said cutting blades have cut the edible portion (30) from the first and second shells.

15. Apparatus as claimed in claim 14 wherein said urging means (41) comprises jaw members (42, 43) which resiliently urge said cutting blades (21, 22) towards each other.

16. Apparatus as claimed in claim 15 wherein said jaw members (41, 42) are arranged to urge said cutting blades (21, 22) towards each other about a fulcrum (57a), said fulcrum (57a) being comprised by a deflector member (57) which is retracted away from the shellfish after said cutting blades (21, 22) have cut along the inside surfaces of the first and second shells (11, 12), said deflector member (57) being retracted past said jaw members (42, 43) and remaining between said two cutting blades (21, 22) so as to thereby define said fulcrum (57a).

17. Apparatus as claimed in claim 13 wherein said cutting blades (21, 22) lie in respective planes and in plan view define a shallow acute angle between said planes of said two cutting blades whereby when the edible portion (30) when grasped by said cutting blades (21, 22) can be moved away from the first and second shells (11, 12) and discharged from said grasping means (40) preferentially towards the direction in which said cutting blades diverse from each other.

18. Apparatus as claimed in claim 16 wherein said deflector member (57) is operative to be advanced after grasping of the edible portion (30) by said grasping means (40) whereby said deflector member (57) ejects the edible portion (30) from between said cutting blades (21, 22).

* * * * *